(12) United States Patent
Lange et al.

(10) Patent No.: US 9,195,307 B2
(45) Date of Patent: Nov. 24, 2015

(54) OPERATOR CONTROL DEVICE

(75) Inventors: Werner Lange, Frankfurt (DE); Ingo Zoller, Hösbach (DE)

(73) Assignee: Continental Automotive GmbH, Hannover (DE)

( * ) Notice: Subject to any disclaimer, the term of this patent is extended or adjusted under 35 U.S.C. 154(b) by 5 days.

(21) Appl. No.: 14/233,332

(22) PCT Filed: Jul. 11, 2012

(86) PCT No.: PCT/EP2012/063541
§ 371 (c)(1),
(2), (4) Date: Feb. 3, 2014

(87) PCT Pub. No.: WO2013/010866
PCT Pub. Date: Jan. 24, 2013

(65) Prior Publication Data
US 2014/0139476 A1 May 22, 2014

(30) Foreign Application Priority Data
Jul. 18, 2011 (DE) .......................... 10 2011 079 357

(51) Int. Cl.
*G06F 3/01* (2006.01)
*H01F 5/00* (2006.01)
*H02K 33/02* (2006.01)
*G06F 3/041* (2006.01)

(52) U.S. Cl.
CPC ................ *G06F 3/016* (2013.01); *G06F 3/041* (2013.01); *H01F 5/003* (2013.01); *H02K 33/02* (2013.01)

(58) Field of Classification Search
CPC ...................... G05B 2219/40553; G06F 3/016; G06F 3/04886; B60W 50/16; F15B 13/14; H01H 13/85
See application file for complete search history.

(56) References Cited

U.S. PATENT DOCUMENTS

| 6,067,081 | A | 5/2000 | Hahlganss et al. |
| 6,169,469 | B1 * | 1/2001 | Misumi et al. .................. 335/78 |
| 6,437,770 | B1 * | 8/2002 | Venema et al. ............... 345/156 |
| 7,292,227 | B2 | 11/2007 | Fukumoto et al. |
| RE40,341 | E * | 5/2008 | Salcudean et al. ............ 345/184 |
| 8,760,248 | B2 * | 6/2014 | Marie ........................... 335/230 |

(Continued)

FOREIGN PATENT DOCUMENTS

| DE | 196 38 015 | 3/1998 |
| DE | 10 2010 007 486 | 8/2011 |
| EP | 1 310 860 | 5/2003 |

*Primary Examiner* — Kent Chang
*Assistant Examiner* — William Lu
(74) *Attorney, Agent, or Firm* — Cozen O'Connor

(57) ABSTRACT

An operator control device has an operator control element with haptic feedback. The operator element includes one or more sensors and can be activated by an operator by an inputting element. The operating control device includes first and second ferromagnetic two-dimensional components. The components are arranged in parallel and configured to move relative to each other. The first ferromagnetic two-dimensional component is configured to form the operator control element. The first ferromagnetic two-dimensional component includes at least one flat coil that is arranged on a printed circuit board and is arranged between the ferromagnetic components. The first and second ferromagnetic two-dimensional components are configured to move with respect to each other when said at least one flat coil is energized, and the printed circuit board bearing the flat coil is permanently arranged on a face of said second ferromagnetic two-dimensional component.

8 Claims, 1 Drawing Sheet

(56) References Cited

U.S. PATENT DOCUMENTS

| | | |
|---|---|---|
| 2003/0030533 A1 | 2/2003 | Waffenschmidt |
| 2005/0077165 A1* | 4/2005 | Akieda et al. ............... 200/520 |
| 2006/0109254 A1 | 5/2006 | Akieda et al. |
| 2006/0109256 A1* | 5/2006 | Grant et al. ............... 345/173 |
| 2006/0119586 A1 | 6/2006 | Grant et al. |
| 2006/0256075 A1 | 11/2006 | Anastas et al. |
| 2008/0296984 A1* | 12/2008 | Honma et al. ............... 310/17 |
| 2012/0112553 A1* | 5/2012 | Stoner et al. ............... 307/104 |
| 2012/0306798 A1* | 12/2012 | Zoller et al. ............... 345/173 |
| 2013/0249323 A1* | 9/2013 | Backes ............... 310/12.16 |

* cited by examiner

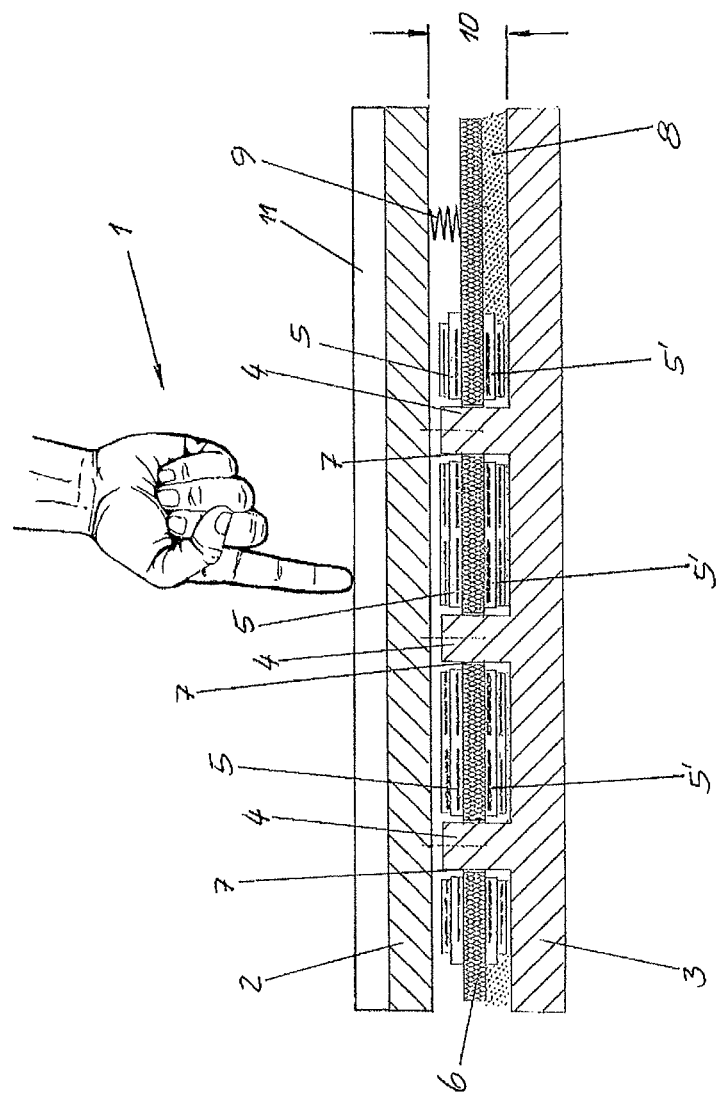

OPERATOR CONTROL DEVICE

CROSS-REFERENCE TO RELATED APPLICATIONS

This is a U.S. national stage of PCT Application No. PCT/EP2012/063541, filed on 11 Jul. 2012, which claims priority to the German Patent Application No. 10 2011 079 357.7, filed on 18 Jul. 2011, each of which is hereby incorporated herein in its entirety by reference.

FIELD OF THE INVENTION

The invention relates to an operator control device having an operator control element with haptic feedback, wherein the operator control element has one or more sensors and can be activated by an operator by an inputting element, wherein the operator control device includes a first and a second ferromagnetic two-dimensional components that are oriented with their large faces parallel to one another and can be moved relative to one another, wherein the first ferromagnetic two-dimensional component forms the operator control element or transmits its movement entirely or partially to the operator control element, and has at least one flat coil that is arranged on a printed circuit board and between the ferromagnetic two-dimensional components with its plane parallel to the ferromagnetic two-dimensional components, and wherein the ferromagnetic two-dimensional components can be moved with respect to one another by energizing the flat coil.

DESCRIPTION OF THE RELATED ART

Haptic feedback from operator control elements is required in particular if an operator cannot directly perceive the operator control process carried out by him. While the opening or closing of the switching contacts can be perceived by an operator through changing haptic of the operator control element in the operator control devices having electromechanical switches, this is not necessarily the case with electronic switches. Known in the prior art for this reason are operator control elements, which use movements of the operator control element that can be perceived by the operator, to give haptic feedback about an operator control process that has taken place. Touch screens are good examples of known haptic operator control elements. However, touch screens require a large installation space, a complex drive, and special structural measures. This is so especially if they are to be used, for example, in an environment which is subject to particularly large temperature differences, such as, e.g., in a motor vehicle that has to maintain its functional capability both in arctic cold as well as in the summer heat.

In the case of operator control devices of the type mentioned at the beginning, the printed circuit board which bears the flat coil is arranged between the ferromagnetic components. Owing to the tolerances in the thickness of the printed circuit board, bending of the printed circuit board, and deviating from the ideal plane of the printed circuit board, the distance between the ferromagnetic two-dimensional components must be given relatively large dimensions.

This leads to a large overall constructional height of the operator control device and to a relatively small magnetic flux as well as relatively low forces in the system of the operator control device.

SUMMARY OF THE INVENTION

An object of the invention is therefore to provide an operator control device of the type mentioned at the beginning which has a low overall constructional height.

This object is achieved according to the invention in that the printed circuit board which bears the flat coil is permanently arranged on the face of the second ferromagnetic two-dimensional component facing the first ferromagnetic two-dimensional component.

As a result of this embodiment, the printed circuit board no longer has to have such a degree of stiffness that it bears the flat coil in a structurally stable planar fashion since it now receives its structural stability from the first ferromagnetic two-dimensional component.

The thickness of the printed circuit board then can ensure reliable insulation from the second ferromagnetic two-dimensional component and can be minimized in this way.

The evenness of the printed circuit board resulting from the first ferromagnetic two-dimensional component, the avoidance of undulations of the printed circuit board, and the reduced thickness of the printed circuit make it possible to provide the distance between the two ferromagnetic two-dimensional components and therefore also the overall constructional height of the operator control device reduced dimensions and also possible to generate relatively large actuating forces given a certain amount of available energy.

A magnetic field is built up by the energization of the coil and the two ferromagnetic two-dimensional components are drawn to each other.

This movement can be perceived directly or indirectly by the inputting element such as, for example, a finger of an operator.

The flat coil can be produced particularly easily and continuously if it is composed of conductor tracks which are arranged on the printed circuit board. In this context, the printed circuit board can be copper lined and etched in such a way that the conductor tracks remain in a preferably spiral-shaped spiral track.

Instead of the etching of the conductor tracks, they can also be generated, for example, by printing the printed circuit board with a conductor track material such as silver paste.

In order to concentrate the magnetic flux, the flat coil preferably has a ferromagnetic coil former which extends at a right angle to the plane of the ferromagnetic two-dimensional components.

Owing to the reduced spacing between the two ferromagnetic two-dimensional components, the height of the pole shoes is also reduced. Furthermore, owing to the reduced tolerances which are to be complied with, the pole shoe can extend close to the first ferromagnetic component, as a result of which the magnetic flux is increased.

If the coil former is formed as a part of one of the ferromagnetic two-dimensional components, the number of components and expenditure on mounting are reduced.

In order to attach the printed circuit board in a planar fashion to the second ferromagnetic two-dimensional component, the printed circuit board can be arranged on the second ferromagnetic two-dimensional component by means of a bonding layer.

A further reduction in the constructional height is achieved by virtue of the fact that the printed circuit is applied to the second ferromagnetic two-dimensional component using film technology, in particular using thick film technology.

The second ferromagnetic two-dimensional component is preferably arranged in a non-movable fashion with the result that when the flat coil is energized only the first ferromagnetic component is moved in the direction of the second ferromagnetic two-dimensional component.

In order to move the ferromagnetic two-dimensional components into their position of rest when the flat coil is not energized, the first ferromagnetic two-dimensional component and the second ferromagnetic two-dimensional component can be moved away up to a specific maximum spacing from each other by a spring element when the flat coil is not energized. In one embodiment, the maximum spacing of the two ferromagnetic two-dimensional components is determined by stops.

The operator control element can be embodied as a display. In some embodiments, this display can be configured by printing onto it various numbers in the form of a telephone keypad. It is therefore possible, for example, to select different numbers if the limb (or an element extending the limb) of the operator touches the operator control element on the corresponding number and the display has a corresponding device with which the position of the inputting limb/element can be determined on the display.

The display can be embodied here as an electro-optical display in which, for example, various menus, submenus or individual values can be represented on the display, and those values can then be detected by the display being correspondingly touched at the corresponding position of the representation of the menus, submenus or values to be selected. Such optoelectronic displays can be embodied, for example, as a light-emitting diode matrix, an organic light-emitting diode display or a liquid crystal display and are known and referred to as touch screens.

The flat coils are energized with a direct current or a low frequency alternating current in order to move the two-dimensional ferromagnetic components with respect to one another. In addition, this current can be modulated with a frequency in the audible range such as, for example, 1 kilohertz, with the result that this frequency can be additionally heard. It is therefore possible to hear a click which sounds as if an electromagnetic switch has been opened or closed.

BRIEF DESCRIPTION OF THE DRAWINGS

An embodiment of the invention is illustrated in the drawing and will be described in more detail below.

The FIGURE shows a cross section of an operator control device in in accordance with one embodiment of the present invention.

DETAILED DESCRIPTION OF THE PREFERRED EMBODIMENTS

The operator control device illustrated in the figure has a first ferromagnetic two-dimensional component 2 facing an operator 1. The first ferromagnetic two-dimensional component 2 bears on the operator side an optoelectronic display 11 such as, for example, an LCD. The first ferromagnetic two-dimensional component 2 can be moved transversely with respect to the planar extent thereof.

In parallel with the first ferromagnetic two-dimensional component 2 is a second ferromagnetic two-dimensional component 3 that is arranged in a non-movable fashion.

The second ferromagnetic two-dimensional component 3 has spaced-apart coil formers 4 which are directed toward the first ferromagnetic two-dimensional component 2 and are embodied in the second ferromagnetic two-dimensional component 3 as one piece.

The coil formers 4 are each surrounded by a pair of spiral-like flat coils 5, 5'.

The flat coils 5, 5' are printed onto a printed circuit board 6 which extends over the surface of the ferromagnetic two-dimensional components 2, 3 and is embodied as a ceramic substrate, wherein the flat coils 5 are printed onto the printed circuit board 6 on the side facing the first ferromagnetic two-dimensional component 2, and the flat coils 5' are printed onto the printed circuit board 6 on the side facing the second ferromagnetic two-dimensional component 3.

The coil formers 4 project through cutouts 7 which are correspondingly formed in the printed circuit board 6.

The printed circuit board 6 which bears the flat coils 5, 5' is bonded onto the face of the second ferromagnetic two-dimensional component 3 facing the first ferromagnetic two-dimensional component 2 by means of a bonding layer 8.

When the flat coils 5, 5' are not energized, the first ferromagnetic two-dimensional component 2 is kept at the illustrated maximum spacing 10 with respect to the second ferromagnetic two-dimensional component 3 by a spring element 9 which is arranged between the first ferromagnetic two-dimensional component 2 and the printed circuit board 6.

Of course, further spring elements 9 (not shown) can be arranged, or distributed, over the surface of the first ferromagnetic two-dimensional component 2 and the printed circuit board 6, resulting in that a movement of the first ferromagnetic two-dimensional component 2 always takes place parallel to the second ferromagnetic two-dimensional component 3.

If a sensor system (not shown) detects that a finger of the operator 1 touches the electro-optical display 11, the flat coils 5, 5' are energized.

If the current flows through the flat coils 5, 5', a magnetic flux is induced in the ferromagnetic two-dimensional components 2, 3 and in this way a magnetic circuit is closed, resulting in that the two ferromagnetic two-dimensional components 2, 3 are drawn toward one another in relative terms counter to the force of the spring elements 9 without touching each other.

At the same time, the first ferromagnetic two-dimensional component 2 forms, together with the electro-optical display 11, an operator control element, resulting in that the operator haptically senses the movement of the first ferromagnetic two-dimensional component 2 by means of the electro-optical display 11.

Thus, while there have shown and described and pointed out fundamental novel feature of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An operator control device having an operator control element with haptic feedback, wherein the operator element has one or more sensors and can be activated by an operator by an inputting element, the operator control device comprising:

a first ferromagnetic two-dimensional component and a second ferromagnetic two-dimensional component arranged in parallel to face each other and configured to move relative to each other, the second ferromagnetic two-dimensional component having at least one ferromagnetic coil former that extends at a right angle to a plane of said first and second ferromagnetic two-dimensional components;

a printed circuit board arranged between said first and second ferromagnetic two-dimensional components with its plane parallel to said first and second ferromagnetic two-dimensional components, the printed circuit board having cutouts;

at least one first flat coil printed on a first surface of the printed circuit board that faces the first ferromagnetic two-dimensional component; and at least one second flat coil printed on a second surface of the printed circuit board that faces the second ferromagnetic two-dimensional component, wherein each at least one ferromagnetic coil former projects through a cutout of the printed circuit board, each ferromagnetic coil former being surrounded by a pair of coils comprising one first flat coil and one second flat coil, wherein said first ferromagnetic two-dimensional component is configured for one of forming the operator control element and transmitting its movement at least partially to the operator control element, wherein said first and second ferromagnetic two-dimensional components are configured to move with respect to each other when at least one of said first and second flat coils is energized, and wherein said printed circuit board is permanently arranged on a face of said second ferromagnetic two-dimensional component facing said first ferromagnetic two-dimensional component.

2. The operator control device of claim 1, wherein said printed circuit board is arranged on said second ferromagnetic two-dimensional component using a bonding layer.

3. The operator control element of claim 1, wherein said printed circuit board is applied to said second ferromagnetic two-dimensional component using a film technology.

4. The operator control device of claim 1, wherein said second ferromagnetic two-dimensional component is arranged in a non-movable configuration.

5. The operator control device of claim 1, wherein said first ferromagnetic two-dimensional component and said second ferromagnetic two-dimensional component can be moved away from each other by a spring element to a maximum spacing when said at least one flat coils is not energized.

6. The operator control device of claim 5, wherein said maximum spacing of said first and second ferromagnetic two-dimensional components is determined by stops.

7. The operator control device of claim 1, wherein the operator control element includes a display.

8. The operator control device of claim 7, wherein said display is an electro-optical display.

* * * * *